United States Patent [19]
Omi et al.

[11] 3,965,774
[45] June 29, 1976

[54] REDUCTION GEAR APPARATUS

[75] Inventors: Toshimitsu Omi; Takashi Omi, both of Anjo, Japan

[73] Assignee: Omi Industrial Company, Limited, Japan

[22] Filed: Jan. 17, 1975

[21] Appl. No.: 541,932

[30] Foreign Application Priority Data
Jan. 18, 1974  Japan.................................. 49-8722

[52] U.S. Cl. ................................................. 74/805
[51] Int. Cl.² ........................................... F16H 1/28
[58] Field of Search ............................. 74/804, 805

[56] References Cited
UNITED STATES PATENTS
1,350,077  8/1920  Loudon ............................ 74/804 X
2,966,808  1/1961  Grudin ............................. 74/805 X
3,144,791  8/1964  Menge, Sr. ........................... 74/804

Primary Examiner—Benjamin W. Wyche
Assistant Examiner—Lance W. Chandler
Attorney, Agent, or Firm—George B. Oujevolk

[57] ABSTRACT

In a reduction gear apparatus consisting of a pair of planetary gears rotatably mounted on an input shaft, and a plurality of internal gears positioned within a casing so as to engage with said planetary gears, an output shaft rotatably mounted to said casing is rotated at two different reduction ratios by selectively fixing said internal gears to said casing.

3 Claims, 4 Drawing Figures

FIG. 3

| gear portion (22a) | input shaft (13) | gear (18) |
|---|---|---|
| 1 | 1 | 1 |
| (−) $\frac{Z1}{Z3}$ | 0 | 1 |
| X | 1 | 0 |

$$X = 1 - \frac{Z1}{Z3}$$

FIG. 4

| gear (23) | input shaft (13) | gear portion (22b) |
|---|---|---|
| 1 | 1 | 1 |
| (−) $(1-X)\frac{Z4}{Z5}$ | 0 | 1−X |
| R | 1 | X |

$$R = \frac{N2}{N1} = 1 - (1-X)\frac{Z4}{Z5}$$

REDUCTION GEAR APPARATUS

The present invention relates to a reduction gear apparatus, more particularly it relates to a reduction gear apparatus for obtaining a minute reduction ratio. The former reduction gear apparatus of this type was faulty in that it could not be used in machines that required minute reduction ratios because the output shaft's reduction ratio was large with respect to the input shaft.

It is an object of this invention to provide a reduction gear apparatus in which the reduction ratio of the output shaft can be greatly reduced with respect to the input shaft. Another object of the present invention is to provide a reduction gear apparatus in which the output shaft can be rotated according to two or more different reduction ratios.

Still further objects of the present invention will become apparent from the following specification and claims, taken together with the following drawings, in which:

FIG. 3 and FIG. 4 are charts for computing the reduction ratio of each gear.

Figure 1:
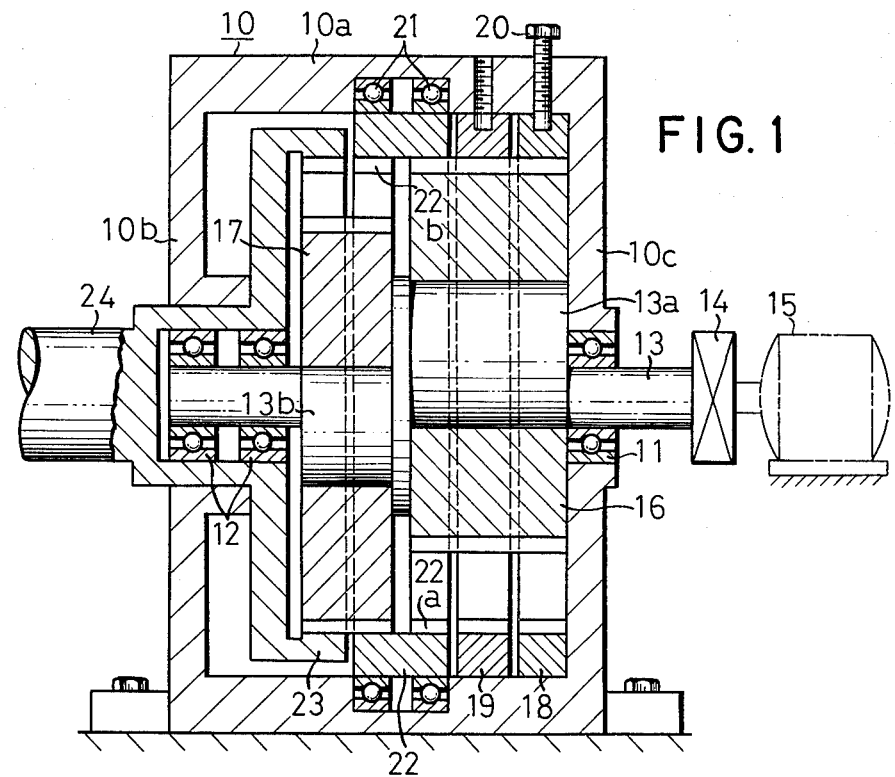
FIG. 1 is the vertical cross-section of the reduction gear apparatus of the present invention.
Figure 2:
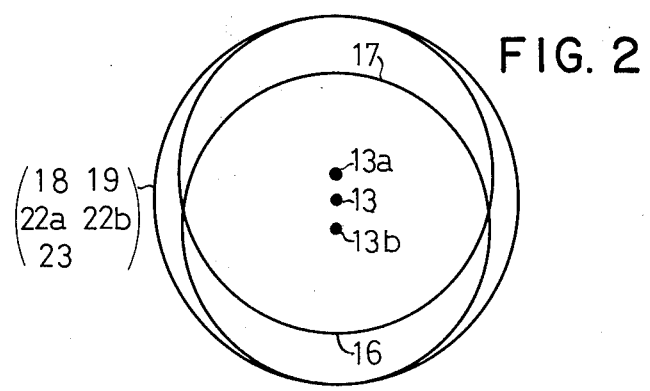
FIG. 2 is a diagram outlining the engagement of the gears in FIG. 1.

More precisely, in the reduction gear apparatus of FIG. 1a, casing 10 has a cylindrical portion 10a and a pair of end faces 10b, 10c, and is substantially cylindrically shaped with both end portions closed. An input shaft 13 rotatably mounted by bearings 11, 12 located in the end faces of said casing 10 is provided with a pair of eccentric shaft portions 13a, 13b at its central part, with one end of the shaft protruding from said end face 10c of the casing 10. The protruding end of said input shaft 13 is coupled to an electric motor 15 via a coupling 14 and rotates along with the motor 15 at a constant speed. First and second planetary gears 16, 17 constructed with a large number of teeth on their outer periphery, are rotatably mounted on eccentric shaft portions 13a, 13b, respectively, of said input shaft 13. On the other hand, first and second internal gears 18, 19 constructed with a large number of teeth on their inner periphery, are positioned at the inner central portion 10a of casing 10 to engage separately with said first planetary gear 16. Said first and second internal gears 18, 19 are selectively fixed at their outer periphery to cylindrical portion 10a of said casing 10 by bolts 20 which protrude through cylindrical portion 10a. A coupling gear 22, rotatably mounted to the inner cylindrical portion 10a of said casing 10 by a bearing 21 adjacent to said internal gear 19, is provided with both a first internal gear portion 22a having a large number of teeth and engaged with said first planetary gear 16, and a second internal gear portion 22b having a large number of teeth and engaged with second planetary gear 17. A third internal gear 23, constructed with a large number of teeth on its inner periphery is rotatably mounted to the end face 10b of said casing 10 to engage with said planetary gear 17. An output shaft 24 is integrally connected to the portion of said internal gear 23 protruding from the end face 10b of said casing 10.

In the embodiment constructed as described above, the reduction gear ratio, namely, the reduction ratio R, may be computed from input shaft 13's rotational frequency N1 and output shaft 24's rotational frequency N2.

First, the number of teeth of first internal gear 18, second internal gear 19, first internal gear portion 22a of the coupling internal gear 22, second internal gear portion 22b of the coupling internal gear 22, and third internal gear 23 shall be Z1, Z2, Z3, Z4 and Z5, respectively.

Now, when said first internal gear 18 is fixed by the bolt 20 to the cylindrical portion 10a of the casing 10, with the planetary gear mechanism being composed of the first internal gear 18, the coupling internal gear 22 and the first planetary gear 16, the speed ratio X of the first internal gear portion 22a of said coupling internal gear 22 with respect to said input shaft 13 is found to be $$X = 1 - Z1/Z3 \qquad (a)$$

as is evident from the tabulation in FIG. 3.

Next, when the second internal gear portion 22b of said coupling internal gear 22 rotates simultaneously with said first internal gear portion 22a at the aforementioned speed ratio X, with the planetary gear mechanism being composed of second internal gear portion 22b of said coupling internal gear 22, the third internal gear 23 and the second planetary gear 17, the reduction ratio R of the third internal gear 23, that is to say, of the output shaft 24, is found to be $$R = 1 - (1 - X)\frac{Z4}{Z5} \qquad (b)$$

as is evident from the tabulation in FIG. 4.

Then, inserting X of equation (a) in equation (b) yields $$R = 1 - (1 - 1 + \frac{Z1}{Z3})\frac{Z4}{Z5}$$
$$= 1 - \frac{Z1 \cdot Z4}{Z3 \cdot Z5}$$
$$= \frac{Z3 \cdot Z5 - Z1 \cdot Z4}{Z3 \cdot Z5} \qquad (c)$$

where R is the reduction ratio of the output shaft 24 with respect to input shaft 13.

Now, to cite an example in which this reduction ratio can be reduced, when the number of teeth of each of the internal gears and internal gear portions are taken to be Z1 = 51, Z3 = 50, Z4 = 49, and Z5 = 50 (and, moreover, where shifted gears are used for each of the internal gears and internal gear portions of the present example), the reduction ratio R is obtained by using equation (c), as follows:

$$R = \frac{50 \times 50 - 51 \times 49}{50 \times 50}$$
$$= \frac{2500 - 2499}{2500}$$
$$= \frac{1}{2500}.$$

Therefore, in accordance with the provisions of this invention, a desired minute reduction ratio R can be easily obtained irrespective of the number of teeth of each planetary gear by suitably selecting the number of teeth of each internal gear and internal gear portion.

Now, if said first internal gear 18 is left to freely rotate and second internal gear 19 is fixed by bolt 20 to the inner cylindrical portion 10a of casing 10, the reduction ratio Ra in this case is evident in the manner of equation (c):

$$Ra = \frac{Z3 \cdot Z5 - Z2 \cdot Z4}{Z3 \cdot Z5} \quad (d)$$

Thus, according to the provisions of this invention, two different reduction gear ratios R and Ra can be obtained by selectively fixing said first and second internal gears 18, 19 to the inner cylindrical portion 10a of the casing 10. Furthermore, in said equation (c), if $Z1 = n + 1$, $Z3 = Z5 = n$, $Z4 = n - 1$ (where $n$ is any positive number), then the reduction ratio R becomes $$R = \frac{n^2 - (n^2 - 1)}{n^2}$$

$$= \frac{1}{n^2}.$$

If desired, a minute reduction ration of $1/n^2$ may thus be obtained.

From the foregoing, it is apparent that the present invention provides a reduction gear apparatus in which the reduction ratio of the output shaft can be greatly reduced with respect to the input shaft, and in which said output shaft can be selectively rotated at two or more reduction ratios.

While a particular embodiment of this invention has been illustrated and described, modifications thereof will occur to those skilled in the art. For instance, the reduction ratio may be varied incrementally over a wide range by providing two or more of the abovementioned planetary gears and increasing the transmission power, or by providing two or more of the abovementioned internal gears which are selectively fixed to the casing.

What is claimed is:

1. A reduction gear apparatus comprising a casing, an input shaft rotatably mounted in said casing having a pair of eccentric shaft portions, a first and second planetary gear rotatably mounted on said eccentric shaft portions of said input shaft, a first and second internal gear positioned in said casing to engage with said first planetary gear respectively, a coupling internal gear rotatably mounted in said casing to engage with said first and second planetary gear, a third internal gear rotatably mounted in said casing to engage with said second planetary gear, an output shaft rotatably mounted in said casing to connected with said third internal gear, means for selectively fixing said first and second internal gear to said casing, whereby said output shaft may be rotated at two different reduction gear ratio.

2. The reduction gear apparatus of claim 1, wherein said coupling internal gear has a first internal gear portion for engaging with said first planetary gear and a second internal gear portion for engaging with said second planetary gear.

3. The reduction gear apparatus of claim 1, wherein said fixing means is a bolt selectively screwed in said first or second internal gear through said casing.

* * * * *